(No Model.)
B. W. FOSTER.
SAW SET.
No. 269,275. Patented Dec. 19, 1882.
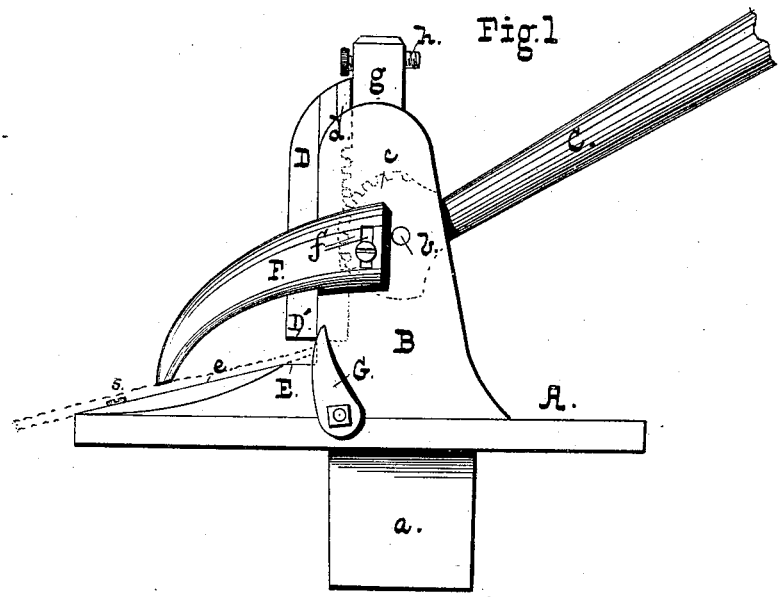
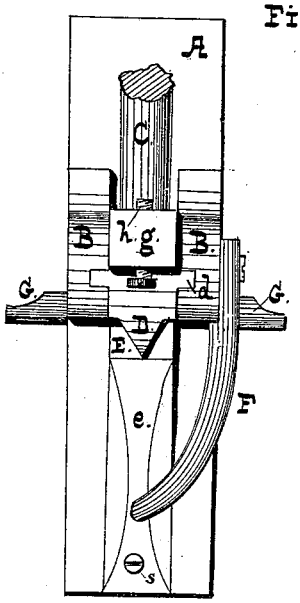
Witnesses
W. A. Bertram
Jed. H. Barclay
Inventor
B. W. FOSTER
by
N. D. Williams.
Attorney.

UNITED STATES PATENT OFFICE.

BRADLEY W. FOSTER, OF HUNTINGTON, WEST VIRGINIA.

SAW-SET.

SPECIFICATION forming part of Letters Patent No. 269,275, dated December 19, 1882.

Application filed April 26, 1882. (No model.)

*To all whom it may concern:*

Be it known that I, BRADLEY W. FOSTER, of Huntington, Cabell county, State of West Virginia, have invented certain new and useful Improvements in Saw-Sets; and I hereby declare the same to be fully, clearly, and exactly described, as follows, reference being had to the accompanying drawings, in which—

Figure 1 is a side elevation, and Fig. 2 a top plan, of the device.

My invention relates to devices for setting the teeth of saws or bending them out of the plane of the saw-blade; and it has for its object to provide a saw-set which will bend the teeth at the base, leaving the teeth themselves plane and flat, whereby sharpening is facilitated, and the saw is made to cut better and remain sharp longer than it will if the teeth are bent in a curve; and my said invention consists, to this end, in a device constructed and operating substantially as hereinafter set forth, the points of novelty being indicated in the claims.

In the drawings, A is a base-piece, having a lug, *a*, adapted to be clamped in an ordinary bench-vise, and B B are standards integral with or firmly secured to the base A.

D is a block, having guides *d*, which fit in grooves in the standards B. At its rear side is a rack with which the teeth of a segment, *c*, integral with the handle C, engage. The handle is pivoted at *b* in the standards. A block, *g*, is secured between the standards at the top, and it carries a set-screw, *h*, which determines the ascent of the plunger or block D. The front edge of the plunger is V-shaped, and it is cut off square at the bottom D′, so as to strike fairly over the anvil E. An incline, *e*, leads up to the anvil, meeting it at the proper angle for the set of the teeth, which may be altered, as desired, by raising or lowering the set-screw S. A finger, F, slotted at *f*, where it is bolted to the standard B, extends down over the incline *e*, as shown. Gages G are pivoted to the standards B, and determine the distance to which the teeth shall enter under the plunger.

In operation the device is clamped in a vise or is bolted to a suitable support, and the gages G are set so as to permit the teeth to enter to the desired distance under the plunger. The finger F is so adjusted as to hold the saw-blade closely down upon the incline *e*. The blade is then slid under the finger, as shown in dotted lines, the teeth being made to abut against the gages G. Each alternate tooth is then brought in order under the plunger, and the lever C is lifted, causing the plunger to descend and bend the tooth down on the anvil. Each tooth is bent at its base, and in being set is flattened, should it be curved. A uniform set is imparted to the teeth, whereby the operation of sharpening them by means of an ordinary triangular file is greatly facilitated.

The device may be constructed at a trifling cost, the parts being of such shape that very little hand-finishing is required.

Having thus described my invention, what I claim is—

1. The combination, substantially as described, of base A, uprights B, lever C, pivoted between said uprights and having segment-rack head, the V-shaped plunger having rack to engage said head, block *g*, set-screw *h*, gage G, curved slotted finger F and its adjusting-screw, the anvil, and the adjusting-screw S, all as set forth.

2. The combination, with the anvil, of the V-shaped plunger having rack-teeth, the uprights B, the lever C, having segment-rack head to engage said rack-teeth, and the screw *h* to limit the movement of the plunger, as set forth.

3. In combination with the base having lug *a*, standard B, block *g*, and set-screw, the V-shaped plunger, anvil E, incline *e*, gage G, and finger F, and mechanism for actuating the plunger, as set forth.

In testimony whereof I have hereunto set my hand this 14th day of April, 1882.

BRADLEY W. FOSTER.

Witnesses:
H. W. BLOSS,
W. B. PRICKITT.